No. 644,700. Patented Mar. 6, 1900.
J. BLUNDELL.
CORKSCREW.
(Application filed. Aug. 19, 1898.)

(No Model.)

Witnesses
Philip Hy. Coventry.
William J. Barber.

Inventor
James Blundell.
per Charles Coventry.
Attorney.

UNITED STATES PATENT OFFICE.

JAMES BLUNDELL, OF SOUTHPORT, ENGLAND.

CORKSCREW.

SPECIFICATION forming part of Letters Patent No. 644,700, dated March 6, 1900.

Application filed August 19, 1898. Serial No. 689,040. (No model.)

*To all whom it may concern:*

Be it known that I, JAMES BLUNDELL, a subject of the Queen of Great Britain, residing at 64 Kensington road, Southport, in the county of Lancaster, England, have invented a new and useful Improvement in Corkscrews, (for which I have applied for a patent in Great Britain, No. 12,039, dated the 27th of May, 1898,) of which the following is a specification.

My invention relates to corkscrews to be used by hand, and has for its object to render them more efficient in use and more convenient.

In using an ordinary corkscrew as hitherto usually constructed it is necessary to remove the hand from the handle after each turn thereof and to regrasp said handle, and this is liable to shake the bottle and its contents. A corkscrew constructed according to my invention obviates this disadvantage, as well as being more rapid in use, inasmuch as when once the handle is grasped a to-and-fro motion thereof drives the screw into the cork. The screw is connected to the handle, so as to turn one way only with relation thereto, by means of a ratchet-and-pawl device, and a detent is provided whereby relative motion may be entirely prevented when it is desired, in order that the cork may be removed from the screw by unscrewing in the usual manner.

Figure 1:
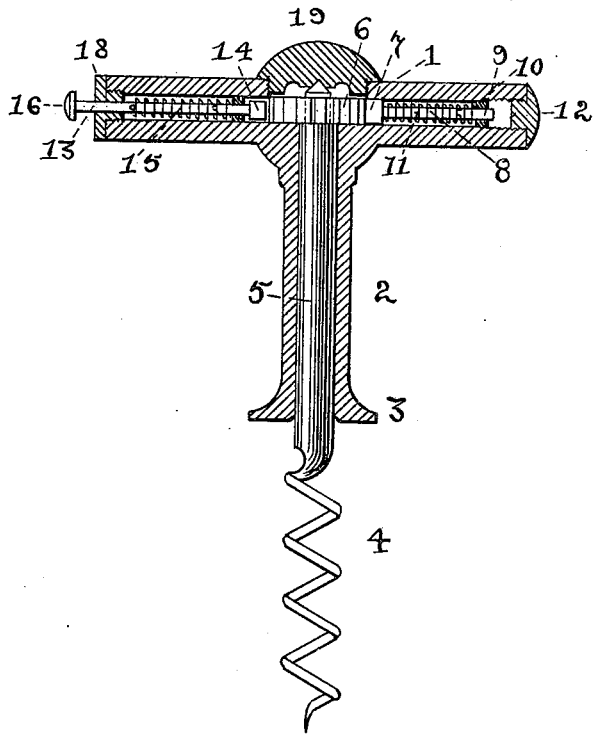
Figure 2:
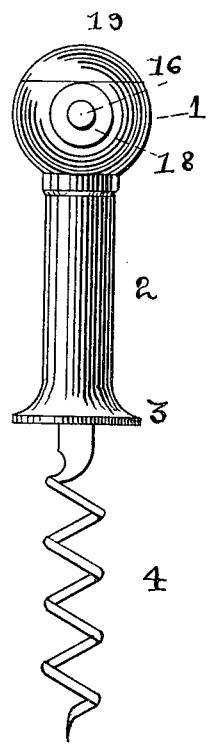
Figure 3:
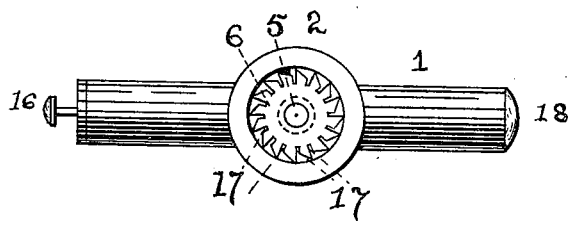

In the drawings, Figure 1 is a vertical section through my corkscrew. Fig. 2 is an elevation at right angles to Fig. 1. Fig. 3 is a plan, the cap 19, hereinafter described, being removed.

1 is the handle, preferably of cast metal, its two arms being bored out, as shown. It has a depending bored-out trunk 2, provided with a guard 3.

4 is the screw proper, rigidly attached to or formed in one with the revolving spindle 5.

6 is a ratchet-wheel rigidly attached to spindle 5, and 7 is its pawl.

8 is the stem or tail of pawl 7, having squared end 9 sliding in washer 10 in the handle, and 11 is its spring. 12 is a screw-plug to close that end of the handle. At the other end of the handle I provide a stem 13, carrying a detent 14, normally kept out of engagement with ratchet-wheel 6 by spring 15 and having a finger-button 16 on its projecting end. This detent 14 is adapted to enter notches 17 made between the teeth of ratchet-wheel 6. (See Fig. 3.) 18 is a screw-plug to close this end of handle 1.

The hollow in the top of handle 1 is closed by a removable cap 19, and a reversed footstep bearing thereon takes up the thrust of spindle 5.

In action when it is desired to withdraw a cork from a bottle the point of screw 4 is pressed against it and the handle 1 is partially rotated backward and forward. On its forward stroke the screw 4 is turned by reason of pawl 7 meshing with ratchet-wheel 6; but on the return stroke the end of pawl 7 rides idly over the teeth. The cork is withdrawn by pulling in the ordinary way, and when it is wished to remove it from the screw 4 finger-button 16 is pressed and detent 14 thus caused to mesh with a notch 17 in ratchet-wheel 6. The screw 4 and handle 1 being thus held relatively rigidly, the cork may be removed as usual.

What I claim as my invention, and desire to secure by Letters Patent, is—

In a corkscrew the combination of handle 1, hollow trunk 2 depending therefrom, spindle 5 located and free to revolve in said trunk, screw 4 attached to said spindle, ratchet-wheel 6 rigidly attached to said spindle, a spring-actuated pawl 7 to prevent rotation of said spindle in one direction while allowing rotation in the other direction, a detent 14 supported on a stem 13, a spring 15 whereby detent 14 is held normally out of engagement with ratchet 6, and a button 16 on the projecting end of said stem, whereby when pressure is applied thereto the revoluble parts are locked, substantially as described.

JAMES BLUNDELL.

Witnesses:
WILLIAM J. BARBER,
CHARLES COVENTRY.